United States Patent
Thakare et al.

(10) Patent No.: US 9,183,189 B1
(45) Date of Patent: *Nov. 10, 2015

(54) NETWORK SITE HOSTING IN A MANAGED ENVIRONMENT

(75) Inventors: Prashant J. Thakare, Mercer Island, WA (US); Andrew S. Huntwork, Seattle, WA (US); Jeremy Boynes, Mercer Island, WA (US); Shashank Shekhar, Karnataka (IN); Pravi Garg, Seattle, WA (US); Vishnu Sadhana, Redmond, WA (US); Gurinder Raju, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 933 days.

This patent is subject to a terminal disclaimer.

(21) Appl. No.: 13/363,816

(22) Filed: Feb. 1, 2012

(51) Int. Cl.
*G06F 15/16* (2006.01)
*G06F 17/22* (2006.01)
*G06F 17/30* (2006.01)
*G06F 21/53* (2013.01)
*H04L 29/06* (2006.01)

(52) U.S. Cl.
CPC ........ *G06F 17/2252* (2013.01); *G06F 17/3089* (2013.01); *G06F 21/53* (2013.01); *H04L 63/10* (2013.01)

(58) Field of Classification Search
CPC . G06F 17/3089; G06F 17/30893; G06F 9/50; G06F 9/5027; G06F 9/5061; G06F 9/5072; H04L 12/2461; H04L 67/10; H04L 47/48
See application file for complete search history.

(56) References Cited

U.S. PATENT DOCUMENTS

| | | | | |
|---|---|---|---|---|
| 7,620,653 | B1 * | 11/2009 | Swartz | 707/103 |
| 8,261,295 | B1 * | 9/2012 | Risbood et al. | 719/328 |
| 2006/0041871 | A1 * | 2/2006 | Friedman et al. | 717/136 |
| 2007/0192215 | A1 * | 8/2007 | Taylor et al. | 705/28 |
| 2007/0234271 | A1 * | 10/2007 | Winkler et al. | 717/100 |
| 2011/0083138 | A1 * | 4/2011 | Sivasubramanian et al. | 719/328 |
| 2011/0161496 | A1 * | 6/2011 | Nicklin | 709/226 |

OTHER PUBLICATIONS

U.S. Appl. No. 13/363,761 entitled "Multipart encoding in Data Aggregation for Network Page Generation," which was filed Feb. 1, 2012.
U.S. Appl. No. 13/363,770 entitled "Loading Customer-Supplied Network Page Generation," which was filed Feb. 1, 2012.
U.S. Appl. No. 13/348,069 entitled "Securing Execution of Customer-Supplied Network Generation Code," which was filed Jan. 11, 2012.

(Continued)

*Primary Examiner* — Brian J Gillis
*Assistant Examiner* — Austin Moreau
(74) *Attorney, Agent, or Firm* — Thomas | Horstemeyer, LLP

(57) ABSTRACT

Disclosed are various embodiments for network site hosting in a managed environment. A request for a network page is obtained, where the network page is associated with a network site hosted by a hosting provider on behalf of a customer. Aggregated data is obtained from a data aggregation service. The aggregated data is aggregated by the data aggregation service from multiple data sources. Page generation code supplied by the customer is executed in one or more machine instances to generate the network page in response to the request. The page generation code has access to the aggregated data. A resource management application facilitates configuration of the machine instances by the customer.

25 Claims, 7 Drawing Sheets

(56) References Cited

OTHER PUBLICATIONS

U.S. Appl. No. 13/363,782 entitled "Error Handling in a Network Page Generation Environment," which was filed Feb. 1, 2012.

U.S. Appl. No. 13/363,787 entitled "Data Contracts for Network Page Generation Code," which was filed Feb. 1, 2012.

U.S. Appl. No. 13/348,051 entitled "Generating Network Pages Using Customer-Supplied Generation Code," which was filed Jan. 11, 2012.

U.S. Appl. No. 13/348,088 entitled "Facilitating Access to Data in Network Page Generation Code," which was filed Jan. 11, 2012.

U.S. Appl. No. 13/348,081 entitled "Virtual File System for Hosted Network Sites," which was filed Jan. 11, 2012.

U.S. Appl. No. 13/348,059 entitled "Generating Network Pages Using Customer-Generated Network Page Portions," which was filed Jan. 11, 2012.

U.S. Appl. No. 13/347,953 entitled "Opportunistic Unloading of Network Applications," which was filed Jan. 11, 2012.

* cited by examiner

NETWORK SITE HOSTING IN A MANAGED ENVIRONMENT

BACKGROUND

Compliance with Payment Card Industry Data Security Standards (PCI DSS) and/or other security standards may present challenges for online merchants. For this and other reasons, online merchants may elect to have their electronic commerce platform managed by a third-party electronic commerce hosting provider who ensures compliance with the security standards. However, merchants may lose flexibility in customizing or configuring their network sites when using such a hosted solution as compared with a self-managed solution.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1A:
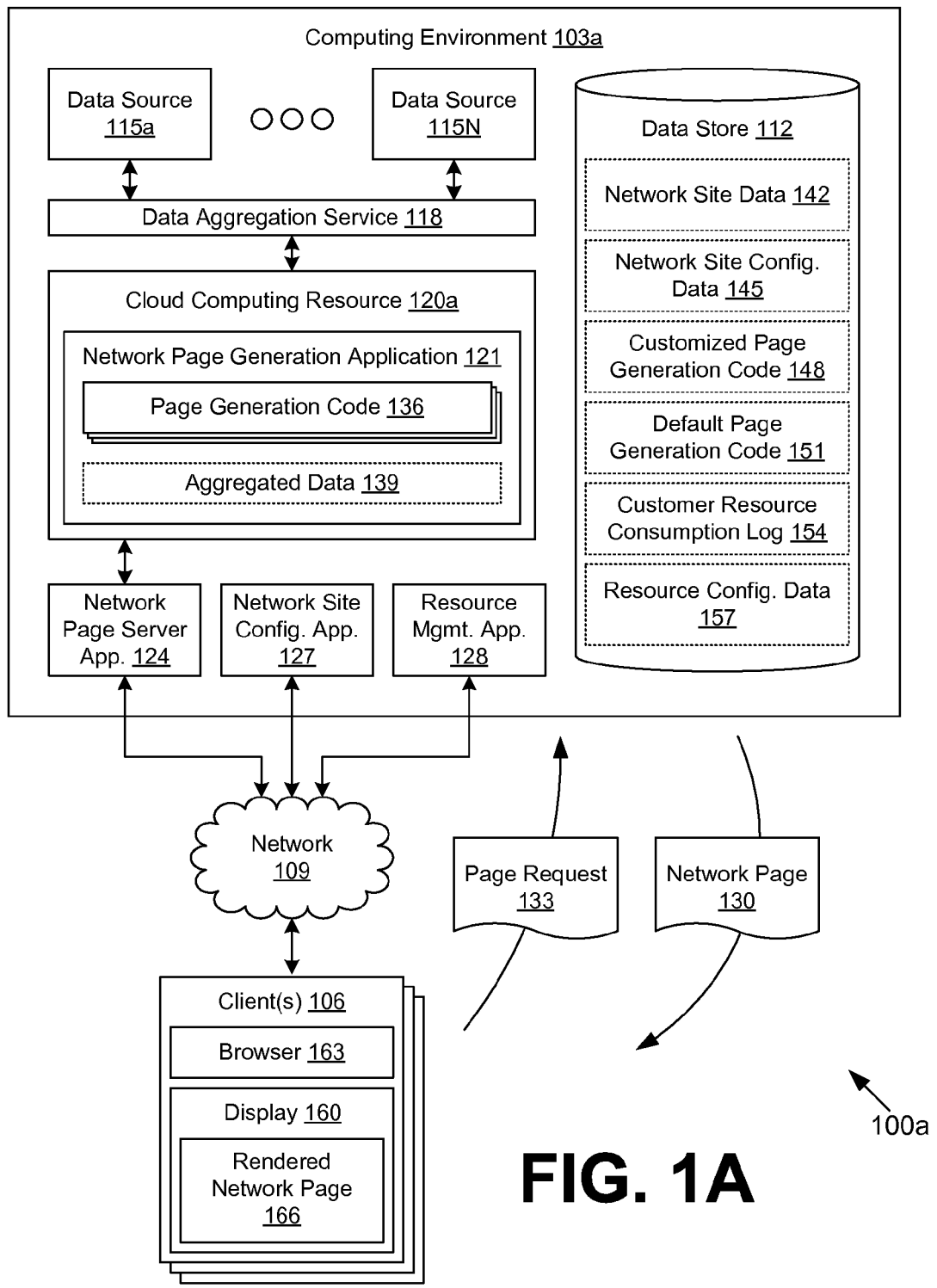
FIGS. 1A and 1B are drawing of networked environments according to various embodiments of the present disclosure.

The present disclosure relates to generation of network pages with a hosted network page server platform. Merchants and other owners of network page sites may contract with hosting providers to generate and serve up their network sites. For example, a hosting provider may offer an end-to-end hosted electronic commerce platform that maintains an item catalog, generates detail pages for items, facilitates searching for items, facilitates browsing for items by way of a taxonomy or by way of suggested items, allows for customer reviews of items, and so on. Such a hosted electronic commerce platform may include functionality relating to shopping carts, order placement, order management and fulfillment, and/or other functionality. Such a platform offers merchants many advantages over self-managed solutions.

Merchants may wish to retain stylistic and content control over their online presence, even if it leverages an end-to-end hosted electronic platform. However, the hosting provider may be reluctant to grant the merchant access to execute arbitrary page generation code due to security concerns and compliance requirements for Payment Card Industry Data Security Standards (PCI DSS) and/or other security standards. Various embodiments of the present disclosure facilitate customer control over network page generation with a hosted network site. As used herein, the term "customer" may also include developers acting on behalf of customers of the hosting provider.

A merchant or other customer of the hosting provider is able to configure a cloud computing resource having one or more machine instances to host resources of a network site. The customer uploads page generation code for execution server-side by a network page generation application executed in the cloud computing resource. Data aggregation is performed on behalf of the page generation code so that the page generation code does not contact data sources directly. Various techniques relating to a data aggregation framework are provided in U.S. patent application Ser. No. 13/348,051 entitled "GENERATING NETWORK PAGES USING CUSTOMER-SUPPLIED GENERATION CODE" and filed on Jan. 11, 2012, and in U.S. patent application Ser. No. 13/348,059 entitled "GENERATING NETWORK PAGES USING CUSTOMER-GENERATED NETWORK PAGE PORTIONS" and filed on Jan. 11, 2012, both of which are incorporated herein by reference in their entirety. In some embodiments, the customer may have control over various components of the data aggregation framework in the cloud computing resource.

In the present disclosure, the customer is able to scale the cloud computing resource as desired to accommodate resource consumption by the page generation code. Automatic monitoring and scaling may be implemented. For ease of setup and use by the customer, the cloud computing resource may be configured by the hosting provider according to a default configuration. In the following discussion, a general description of the system and its components is provided, followed by a discussion of the operation of the same.

With reference to FIG. 1A, shown is a networked environment 100a according to a first embodiment relating to customer-supplied page generation code. The networked environment 100a includes a computing environment 103a in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103a may comprise, for example, a server computer or any other system providing computing capability. Alternatively, a plurality of computing devices may be employed that are arranged, for example, in one or more server banks or computer banks or other arrangements. For example, a plurality of computing devices together may comprise a cloud computing resource, a grid computing resource, and/or any other distributed computing arrangement. Such computing devices may be located in a single installation or may be distributed among many different geographical locations. The computing environment 103a may be operated by a hosting provider to host network sites for various customers.

Various applications and/or other functionality may be executed in the computing environment 103a according to various embodiments. Also, various data is stored in a data store 112 that is accessible to the computing environment 103a. The data store 112 may be representative of a plurality of data stores 112 as can be appreciated. The data stored in the data store 112, for example, is associated with the operation of the various applications and/or functional entities described below.

The components executed by the computing environment 103a, for example, include a plurality of data sources 115a . . . 115N, a data aggregation service 118, a cloud computing resource 120a, a network page generation application 121, a network page server application 124, a network site configuration application 127, a resource management application 128, and other applications, services, processes, systems, engines, or functionality not discussed in detail herein.

Figure 2:
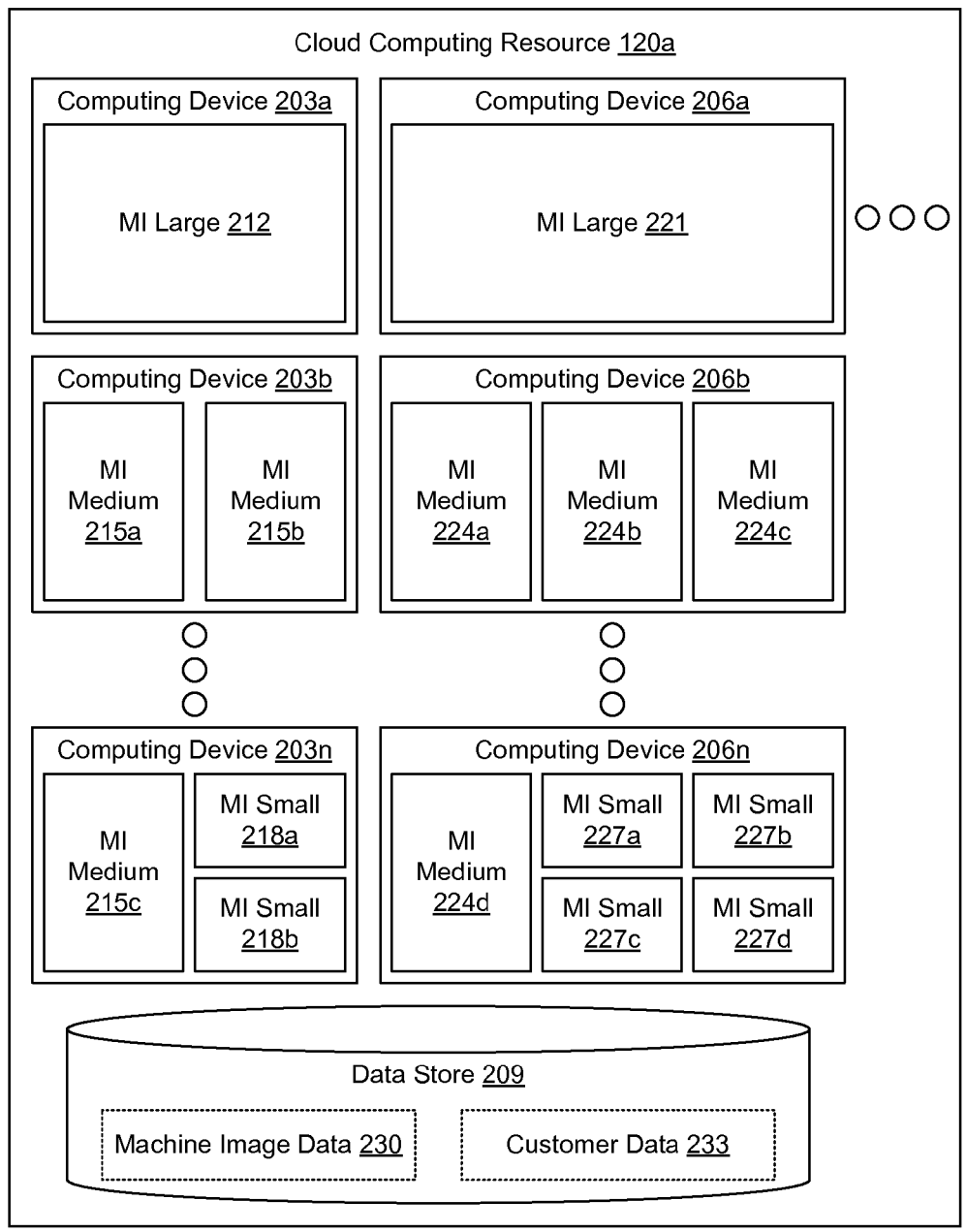
FIG. 2 is a drawing of a cloud computing resource employed in the networked environments of FIGS. 1A and 1B according to various embodiments of the present disclosure.

Referring next to FIG. 2, shown is one example of a cloud computing resource 120a according to various embodiments. The cloud computing resource 120a includes a plurality of computing devices 203a, 203b . . . 203n, a plurality of computing devices 206a, 206b . . . 206n, and a data store 209. Such components of the cloud computing resource 120a may be in data communication with each other and/or external computing devices by way of a network 109 (FIG. 1A). Such computing devices 203 and 206 may be located in a single installation or may be dispersed among many different geographical locations. The term "cloud computing resource" is not intended to be limiting. It is understood that the cloud computing resource 120a as used herein may refer to any plurality of networked computing devices.

The computing devices 203 and 206 may correspond to differing hardware platforms in various embodiments. Accordingly, the computing devices 203 and 206 may have differing hardware configurations of resources, for example, of central processing units (CPUs) that provide general-purpose processing resources, graphics processing units (GPUs) that provide graphics processing resources, system memory, data storage characteristics such as capacity, storage bandwidth, and storage input/output operations per second (IOPS), network bandwidth, and/or other hardware characteristics. In one embodiment, all computing devices 203a, 203b . . . 203n may have a first hardware configuration, while all computing devices 206a, 206b . . . 206n may have a second hardware configuration.

For example, the computing devices 203 may have a certain ratio of a first type of resource to a second type of resource, while the computing devices 206 may have a different ratio of the first type of resource to the second type of resource. In a specific example, the computing devices 203 may have a relatively high amount of memory, while the computing devices 206 may have a relatively high amount of CPU resources. In another specific example, the computing devices 203 may have a relatively high amount of CPU resources, while the computing devices 206 may have a relatively high amount of GPU resources. Although only two sets of computing devices 203 and 206 are shown, it is understood that there may be any number of sets of computing devices 203 and 206 having different hardware configurations.

As a non-limiting example, a customer who is planning to run a data store that will respond to a high volume of queries for small quantities of data may prefer to have a computing device 203, 206 with relatively high storage IOPS capability over storage bandwidth. By contrast, a customer who is planning to run a data backup archive may prefer to have a computing device 203, 206 with relatively high storage bandwidth capability over storage IOPS. The data backup archive may not respond to many requests, but when a request is received, a large quantity of bandwidth may be preferred to transfer data from the data backup archive.

Each computing device 203, 206 may execute one or more machine instances (MI). A machine instance may correspond to an actual machine or to a virtual machine. A virtual machine instance is a virtualized computer system, or a software implementation of a physical computing system. Virtual machines may provide for multiple and/or different operating system environments to run concurrently on a single system having a processor circuit and a memory. As a non-limiting example, multiple instances of a Linux® operating system environment may execute concurrently with multiple instances of a Microsoft® Windows® operating system environment on a single system. Each machine instance may be controlled by different customers, who may have administrative access only to their own instance(s) and no access to the instances of other customers. Multiple machine instances may in fact execute concurrently on a computer system including parallel processors, although multiple instances may appear to execute concurrently on a multithreaded computer system with fewer processors than instances.

Different types of machine instances may be available. In the example of FIG. 2, computing devices 203 may support three types of machine instances: MI large 212, MI medium 215, and MI small 218, each of which may be associated with differing resource configurations. As a non-limiting example, each MI large 212 instance may have four CPU-equivalent units, 15 GB of system memory, and 1,000 GB of data storage. Each MI medium 215 instance may have two CPU-equivalent units, 10 GB of system memory, and 600 GB of data storage. Also, each MI small 218 instance may have one CPU-equivalent unit, 5 GB of system memory, and 250 GB of data storage. In the example of FIG. 2, computing devices 206 may also support three types of machine instances, namely, MI large 221, MI medium 224, and MI small 227. MI large 221, MI medium 224, and MI small 227 may have the same respective configurations as MI large 212, MI medium 215, and MI small 218 or may have different configurations as desired. As a non-limiting example, a MI large 221 instance may have four CPU-equivalent units, 20 GB of system memory, and 1,000 GB of data storage.

The example of three types of machine instances for each type of computing device 203, 206 is not intended to be limiting. In various embodiments, there may be more or fewer types of machine instances for each type of computing device 203, 206. In one embodiment, a machine instance may comprise an allocation of an entire computing device 203, 206 with no virtualization.

In the example of FIG. 2, one MI large 212 instance is executing on computing device 203a, two MI medium 215a, 215b instances are executing on computing device 203b, one MI medium 215c instance and two MI small 218a, 218b instances are executing on computing device 203n, one MI large 221 instance is executing on computing device 206a, three MI medium 224a, 224b, 224c instances are executing on computing device 206b, and one MI medium 224d instance and four MI small 227a, 227b, 227c, 227d instances are executing on computing device 206n. Each machine instance may be associated with a customer, though any customer may be associated with any number of machine instances.

In various embodiments, a customer may be capable of launching new machine instances and/or terminating machine instances dynamically. Thus, the cloud computing resource 120a may provide elastic computing capability to the customer that can vary over time. As a non-limiting example, a customer hosting an infrequently visited network site on a machine instance may suddenly get an influx of network page hits when the network site is mentioned on television or linked on a popular network site. The increase in network site traffic may overwhelm the computing capability of the machine instance, leading to poor network site performance and availability. To cope with the network site traffic, the customer may launch new machine instances and/or transition to a machine instance with more resources and better performance. However, the operator of the cloud computing resource 120a may need to ensure that spare computing capability is available in the cloud computing resource 120a to accommodate such new machine instances. At the same time, too much spare computing capability may be costly and resource inefficient.

Various applications and/or other functionality may be executed in the machine instances and in the computing devices 203, 206 according to various embodiments. Also, various data is stored in a data store 209 that is accessible to the computing devices 203, 206. The data store 209 may be representative of a plurality of data stores 209 as can be appreciated. The data stored in the data store 209 includes, for example, machine image data 230, customer data 233, and potentially other data.

Machine image data 230 may include data used to launch a machine instance. Machine image data 230 may include one or more disk images of an operating system environment. Some of the disk images may be preconfigured for use by any customer or subset of customers, while others may be customized for a particular customer or subset of customers. In one embodiment, one disk image may be loaded by multiple machine instances.

The customer data 233 may include customer-specific data. In one embodiment, all customer configuration data for a machine instance is stored in customer data 233. In this way, such data may be easily shared among many machine instances. As a non-limiting example, the customer data 233 may include network pages to be served up by one or more network page servers executing on machine instances associated with a customer. However, it is understood that in some embodiments customer-specific data may be stored within local data storage associated with a machine instance.

Referring now back to FIG. 1A, the data sources 115 are executed to provide various data used in generating network pages 130 for network sites of customers of the hosting provider. Where the customers are merchants, the data provided by the data sources 115 may relate to electronic commerce data such as, for example, item catalog data, item suggestions data, shopping cart data, checkout data, order data, and so on. In one embodiment, the data sources 115 may comprise web services. In another embodiment, the data sources 115 may comprise files or other forms of data stores. In one scenario, the data sources 115 may be customer supplied.

The data aggregation service 118 is executed to aggregate data from the data sources 115 for use in generation of network pages 130. The data aggregation service 118 may employ parallel fetching to reduce latency when data is aggregated from multiple data sources 115.

The cloud computing resource 120a may be configured to execute a network page generation application 121 and/or other applications. In some embodiments, the cloud computing resource 120a may be configured to execute the network page server application 124, the network site configuration application 127, the resource management application 128, and/or other applications as desired. In contrast to other applications in the computing environment 103a, the applications executed in the cloud computing resource 120a may be under increased control by the customer. For example, the customer may configure the resources consumed by the cloud computing resource 120a and may be billed under a utility computing model. The customer may or may not have increased access to the cloud computing resource 120a. In some cases, the customer may have administrative access to its machine instances within the cloud computing resource 120. In other cases, the hosting provider may have administrative access, and the customer may be able to upload only page generation code that conforms to various restrictions. In various embodiments, either the hosting provider or the customer may supply, control, or configure the network page generation application 121, the network page server application 124, the data aggregation service 118, the data sources 115, and/or other applications.

The network page generation application 121 is executed to generate the network pages 130 in response to page requests 133 obtained from clients 106. The network pages 130 may correspond to web pages, gopher pages, mobile application screens, and/or other forms of network content. Where the customer is a merchant, the network pages 130 may correspond to home pages, catalog pages, item detail pages, shopping cart pages, checkout pages, order confirmation pages, and so on. Such network pages 130 may facilitate selecting items for purchase, rental, download, lease, or other form of consumption. In addition, where the customer is a merchant, the network page generation application 121 may include, or be in communication with, an electronic commerce system that performs various backend functions in order to facilitate the online purchase of items.

The network page generation application 121 may execute page generation code 136 in order to generate the network pages 130. The page generation code 136 may correspond to a default version supplied by the hosting provider or may correspond to a customized version supplied by the customer. In some cases, the page generation code 136 may be transformed or compiled from one code format to another and/or may be interpreted. As a non-limiting example, the page generation code 136 may correspond to JavaServer Pages (JSPs), which may be compiled into Java® servlets, which in turn may be compiled into bytecode which may be executable by the network page generation application 121. To this end, the network page generation application 121 may include a servlet container such as Apache® Tomcat® or another servlet container.

The network page generation application 121 may be configured to obtain aggregated data 139 from the data aggregation service 118 and to provide the aggregated data 139 to the page generation code 136, for example, as a set of predefined variables or by another approach. The network page generation application 121 may act as a "sandbox" for the page generation code 136 to enforce restrictions on application programming interface (API) calls, access to the data source 115, and/or other resources in the computing environment 103a. Alternatively, such a sandbox may exist around the cloud computing resource 120a to restrict access to the data sources 115 and/or other resources of the computing environment 103a by the cloud computing resource 120a.

The network page server application 124 is configured to obtain the page requests 133 from the client 106 over the network 109, to generate network pages 130 in response to the page requests 133 using the network page generation application 121, and to return the network pages 130 to the client 106 by way of the network 109. The network page server application 124 may correspond to a commercially available hypertext transfer protocol (HTTP) server such as, for example, Apache® HTTP Server, Apache® Tomcat®, Microsoft® Internet Information Services (IIS), and/or other servers.

The network site configuration application 127 is executed to facilitate customer configuration of network sites. To this end, the network site configuration application 127 may enable uploading and configuration of the page generation code 136, configuration of various parameters associated with the operation of the network site, order fulfillment management, item catalog management, and/or other functionality. The network site configuration application 127 may implement an HTTP server, a web-based distributed authoring and versioning (WebDAV) server, a file transfer protocol (FTP) server, and/or other servers.

The resource management application 128 may be configured to facilitate customer configuration of the cloud computing resource 120a. For example, the resource management application 128 may facilitate customer configuration of quantities and/or types of machine instances employed by the cloud computing resource 120a for the customer, automatic scaling rules to increase or reduce the quantities and/or types of machine instances, and/or other configuration parameters. The resource management application 128 may also include monitoring functionality and/or other system management functionality.

The resource management application 128 may enable customer control of which applications are hosted in the cloud computing resource 120a as opposed to being hosting in other resources of the computing environment 103a with less customer access and control. As a non-limiting example, the resource management application 128 may allow the customer to configure that the network page server application 124 be executed in the cloud computing resource 120a for the network site of the customer. This may allow the customer increased access for configuring various settings of the network page server application 124 as compared to a situation where the network page server application 124 is managed or controlled by the hosting provider.

The data stored in the data store 112 includes, for example, network site data 142, network site configuration data 145, customized page generation code 148, default page generation code 151, a customer resource consumption log 154, resource configuration data 157, and potentially other data. The network site data 142 corresponds to data used in the generation of the network pages 130 for the hosted network sites of the merchants or other customers. Such data may include, for example, templates, hypertext markup language (HTML), text, extensible markup language (XML), cascading style sheets (CSS), images, audio, video, animations, and/or other data.

The network site configuration data 145 may store parameters and/or other data for controlling the operation and appearance of the hosted network site. Such data may control various electronic commerce functionality such as, for example, item catalogs, item taxonomies, item searching, item recommendations, shopping carts, checkout, order fulfillment, and/or other functionality. The customized page generation code 148 corresponds to page generation code 136 which is created or customized by merchants or other customers. The default page generation code 151 may correspond to a default set of page generation code 136 for a merchant or other customer to use for a base functionality for a network site. The default page generation code 151 may generate network pages 130 having, for example, a default appearance and behavior for a generic electronic commerce site.

The customer resource consumption log 154 may indicate the computing resources consumed on behalf of the customer by the cloud computing resource 120a. The resource configuration data 157 may include various parameters to control the cloud computing resource 120a. To this end, the resource configuration data 157 may include customer preferences for quantities of machine instances, types of machine instances, rules to govern automatic scaling for increased resources or decreased resources, and/or other configuration settings.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 160. The display 160 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 163 and/or other applications. The browser 163 may be executed in a client 106, for example, to access and render network pages 130 served up by the computing environment 103a and/or other servers, thereby generating a rendered network page 166 on the display 160. The client 106 may be configured to execute applications beyond the browser 163 such as, for example, code development applications, file transfer applications, mobile applications, email applications, instant message applications, and/or other applications.

Next, a general description of the operation of the various components of the networked environment 100a is provided. To begin, a merchant or other customer of a hosting provider associated with the computing environment 103a configures a network site to be hosted through the computing environment 103a. The network site may have a common domain that is shared by multiple customers of the hosting provider, or the network site may correspond to a unique domain for each customer. The customer may specify a customized configuration or a default configuration for the cloud computing resource 120a. The merchant or other customer may adopt default page generation code 151 for various network pages 130 accessible through the network site. Alternatively, or additionally, the merchant or other customer may create customized page generation code 148 for generating some or all of the network pages 130 accessible through the network site.

The merchant or other customer may interact with the network site configuration application 127 to customize or make changes to the network site. In various cases, the customer may edit the page generation code 136 directly through the network site configuration application 127, or the customer may upload replacement page generation code 136. Through this system, customers are able to control generation of network pages 130 for their network sites, despite using a hosted infrastructure and potentially a hosted electronic commerce platform.

The page generation code 136 is able to access the aggregated data 139 generated by the data aggregation service 118. In some cases, the page generation code 136 may declare various data that it accesses, which is then aggregated by the data aggregation service 118. In other cases, the data aggregation service 118 may provide a standard set of data from the data sources 115. The set of data may depend on the type of network page 130, e.g., whether the network page 130 is a checkout page, catalog page, order confirmation page, and so on. In one example, the aggregated data 139 may be associated with the hosted electronic commerce platform provided by the hosting provider. The aggregated data 139 may be provided to the page generation code 136 by way of variables such as implicit variables or other variables that are available in the scope of the page generation code 136. The page generation code 136 may be configured to use all of the predefined variables or a subset of the predefined variables. The page generation code 136 and/or other applications of the cloud computing resource 120a may be restricted from accessing the data sources 115 directly.

In operation, the client 106 sends a page request 133 to the network page server application 124 for some network page 130 from a network site of a customer. Where the customer is a merchant, the hosting provider may operate a hosted electronic commerce platform in conjunction with the computing environment 103a. The page request 133 is provided to the network page generation application 121, which then obtains the aggregated data 139 from the data aggregation service 118. The aggregation may be performed automatically in response to the page request 133 or in advance of the page request 133. The data aggregation service 118 fetches the aggregated data 139 from one or more data sources 115.

The page generation code 136 for the requested network page 130 is executed by the network page generation application 121. The network page generation application 121 facilitates access to the aggregated data 139 by the page generation code 136. The page generation code 136 generates the network page 130, and the network page server application 124 serves up the network page 130 to the client 106 in response to the page request 133.

In some embodiments, the page generation code 136 and/or the cloud computing resource 120a may be restricted from accessing one or more of the data sources 115. The customer-supplied page generation code 136 may be isolated from one or more of the data sources 115 for purposes of complying with PCI DSS and/or other security standards. Consequently, the data from the data sources 115 may be accessible only as aggregated data 139 provided by the data aggregation service 118. It is noted that the data aggregation service 118 may generate the aggregated data 139 in response to the page request 133, in response to other events, or at other times as desired.

The page generation code 136 may be analyzed for compliance with one or more policies according to various restrictions when initially configured or compiled and/or at runtime. Such policies may include acceptable content of the network page 130, API usage, usage of scriptlets or other disallowed language features, and so on. If the page generation code 136 is determined to be non-compliant, the page generation code 136 may be unexecuted, terminated if already executing, replaced with default page generation code 151, or another action may be taken.

The cloud computing resource 120a may be capable of automatic scaling, e.g., expanding or contracting with respect to computing capacity in response to demand for the capacity by the page generation code 136. Such usage may be monitored or metered for billing and/or other purposes. To this end, the cloud computing resource 120a usage may be recorded in the customer resource consumption log 154. This recognizes that page generation code 136 for some customers may be more computing resource intensive than page generation code 136 for other customers. Accordingly, an elastic amount of resources may be provided such that the customer is billed for what is used in terms of machine instances, memory, processor time, disk space, and/or other resources that are allocated for the customer.

Figure 1B:
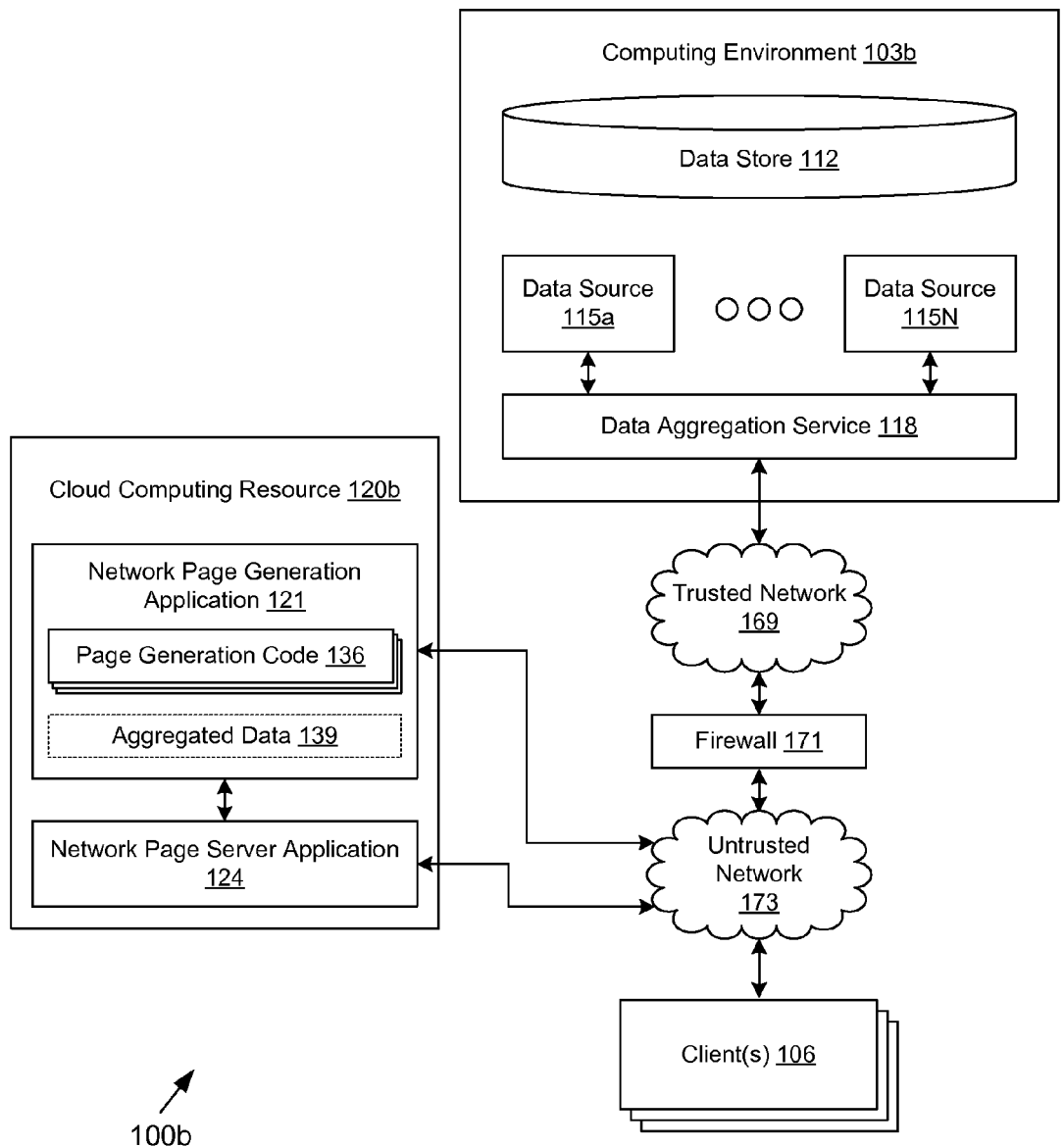

Referring next to FIG. 1B, shown is a networked environment 100b according to another embodiment relating to customer-supplied page generation code 136 (FIG. 1A). The networked environment 100b includes a computing environment 103b in communication with a cloud computing resource 120b and one or more clients 106 by way of a trusted network 169, a firewall 171, and an untrusted network 173. The trusted network 169 and the untrusted network 173 each include, for example, the Internet, intranets, extranets, wide area networks (WANs), local area networks (LANs), wired networks, wireless networks, or other suitable networks, etc., or any combination of two or more such networks. Network traffic between the untrusted network 173 and the trusted network 169 passes through the firewall 171. The firewall 171 may perform network address translation (NAT), packet filtering, and/or other functions, which may serve to logically separate the trusted network 169 from the untrusted network 173 in accordance with network security policies.

In contrast to the networked environment 100a (FIG. 1A), the computing environment 103a (FIG. 1A) has been separated into a computing environment 103b and a cloud computing resource 120b to divide functionality. Such a division may be desirable for security reasons, PCI DSS compliance reasons, and/or other reasons. It may be the case that the computing environment 103b is under control of the hosting provider, while the customer may have at least some control over the cloud computing resource 120b, at least to the extent that the customer is able to configure the page generation code 136, install other software, or otherwise manage the cloud computing resource 120b. In other words, the customer may have a greater level of access to the cloud computing resource 120b than to the computing environment 103b.

In the exemplary arrangement of FIG. 1B, the computing environment 103b includes the data store 112, the data sources 115, the data aggregation service 118, and potentially other data and applications. The cloud computing resource 120b includes the network page generation application 121, the page generation code 136, the aggregated data 139, the network page server application 124, and potentially other data and applications. Such a separation may be employed to prevent direct access by the page generation code 136 to the data sources 115, the data store 112, an electronic commerce system, and/or other data and applications.

The data aggregation service 118 may control access to the customer data by way of network address access control whitelists, pre-shared symmetric keys, signed certificate validation, and/or other authentication approaches. In addition, data request methods may be restricted, e.g., HTTP "GET" may be permissible but HTTP "POST" or "PUT" may be impermissible. It may be the case that no external endpoints for the data sources 115 are exposed to the untrusted network 173, while an external endpoint for the data aggregation service 118 may be exposed to the untrusted network 173 for the network page generation application 121.

Figure 3:
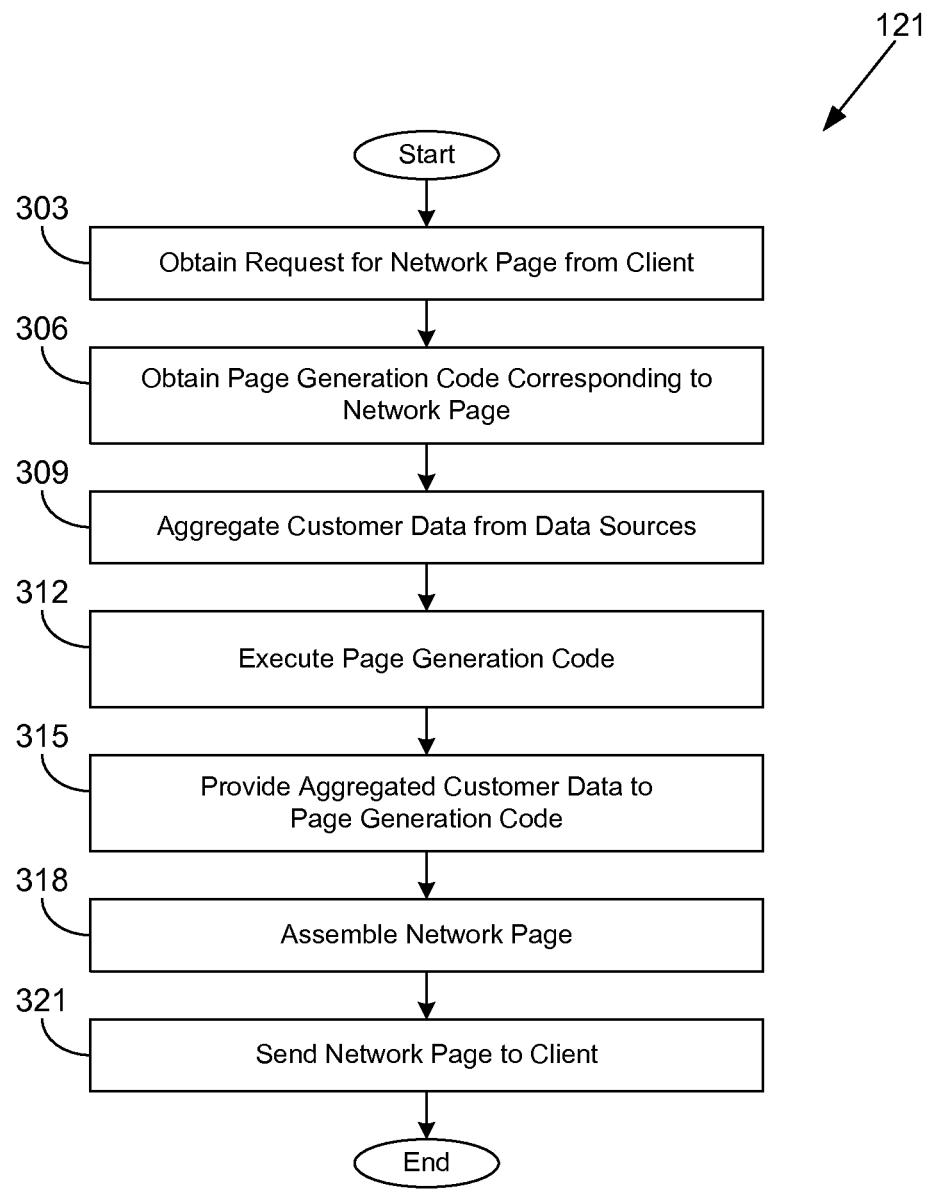
FIG. 3 is a flowchart illustrating one example of functionality implemented as portions of a network page generation application executed in a computing environment in the networked environments of FIGS. 1A and 1B according to various embodiments of the present disclosure.

Continuing on to FIG. 3, shown is a flowchart that provides one example of the operation of a portion of the network page generation application 121 according to various embodiments. It is understood that the flowchart of FIG. 3 provides merely an example of the many different types of functional arrangements that may be employed to implement the operation of the portion of the network page generation application 121 as described herein. As an alternative, the flowchart of FIG. 3 may be viewed as depicting an example of steps of a method implemented in the cloud computing resource 120a (FIG. 2) according to one or more embodiments.

Beginning with box 303, the network page generation application 121 obtains a page request 133 (FIG. 1A) from the client 106 (FIG. 1A) by way of a network page server application 124 (FIG. 1A). The page request 133 indicates a network page 130 (FIG. 1A) from a network site of a customer. The network site is hosted by the hosting provider who operates the computing environment 103a. In box 306, the network page generation application 121 obtains or fetches page generation code 136 (FIG. 1A) corresponding to the requested network page 130. In box 309, the network page generation application 121 aggregates various data pertaining to the customer from one or more data sources 115 (FIG. 1A) by way of the data aggregation service 118 (FIG. 1A).

In box 312, the network page generation application 121 executes the page generation code 136. In doing so, the network page generation application 121 may perform various runtime checks to ensure that the page generation code 136 does not include any impermissible code or content. In box 315, the network page generation application 121 provides the aggregated data 139 (FIG. 1A) to the page generation code 136 as predefined implicit variables.

In box 318, the network page generation application 121 assembles the network page 130 using the output of the page generation code 136 and potentially other data. In box 321, the network page generation application 121 sends the generated network page 130 to the client 106 in response to the page request 133. Thereafter, the portion of the network page generation application 121 ends.

Figure 4:
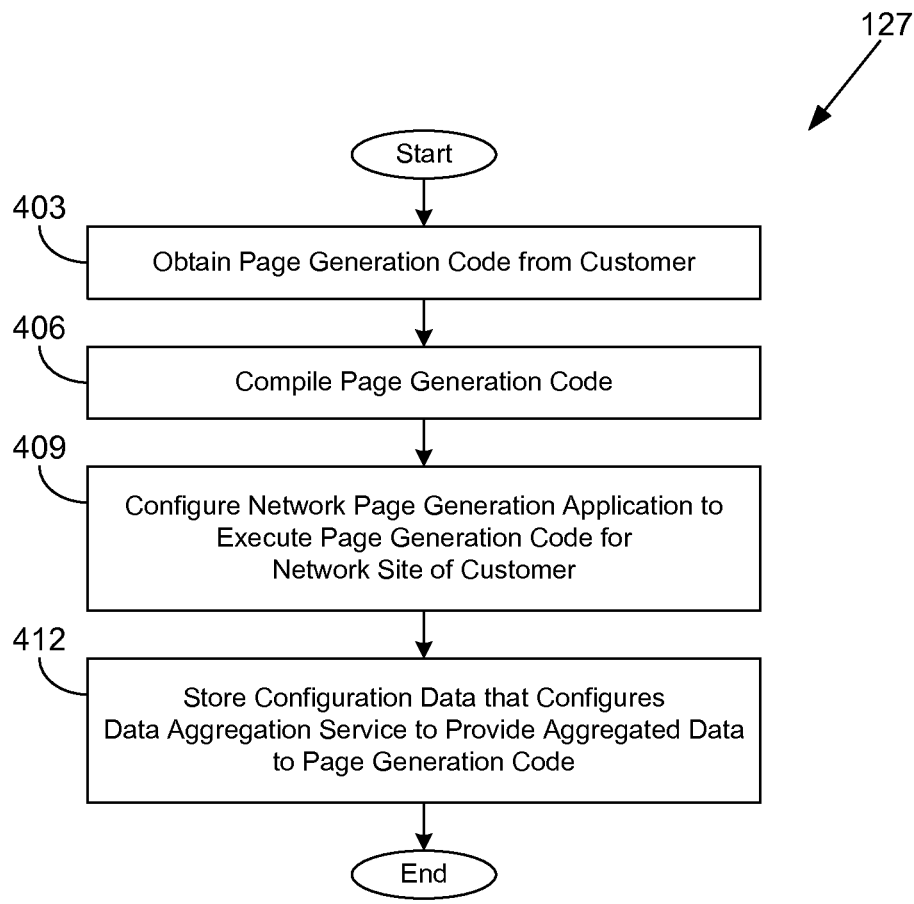
FIG. 4 is a flowchart illustrating one example of functionality implemented as portions of a network site configuration application executed in a computing environment in the networked environment of FIG. 1A according to various embodiments of the present disclosure.

Referring next to FIG. 4, shown is a flowchart that provides one example of the operation of a portion of the network site configuration application 127 according to various embodiments. It is understood that the flowchart of FIG. 4 provides merely an example of the many different types of functional arrangements that may be employed to implement the operation of the portion of the network site configuration application 127 as described herein. As an alternative, the flowchart of FIG. 4 may be viewed as depicting an example of steps of a method implemented in the computing environment 103a (FIG. 1A) according to one or more embodiments.

Beginning with box 403, the network site configuration application 127 obtains page generation code 136 (FIG. 1A) from a customer whose network site is hosted by the hosting provider who operates the computing environment 103a. In one scenario, the page generation code 136 may be obtained as part of a drop-in web application. For example, the page generation code 136 may be packaged with other page generation code 136 within a web application archive (WAR) file. The network site configuration application 127 may be configured to authenticate a client 106 (FIG. 1A) associated with the customer. In box 406, the network site configuration application 127 compiles the page generation code 136. For example, the network site configuration application 127 may compile the page generation code 136 from a JSP into a servlet. The resulting servlet code may also be compiled into bytecode for execution by a Java® Virtual Machine (JVM) or directly by a processor circuit of the computing environment 103a.

In box 409, the network site configuration application 127 configures the network page generation application 121 to execute the compiled page generation code 136 for one or more network pages 130 (FIG. 1A) for the network site of the customer. In box 412, the network site configuration application 127 (FIG. 1A) may store configuration data that configures the data aggregation service 118 (FIG. 1A) to provide a set of aggregated data 139 (FIG. 1A) to the page generation code 136. Thereafter, the portion of the network site configuration application 127 ends.

Figure 5:
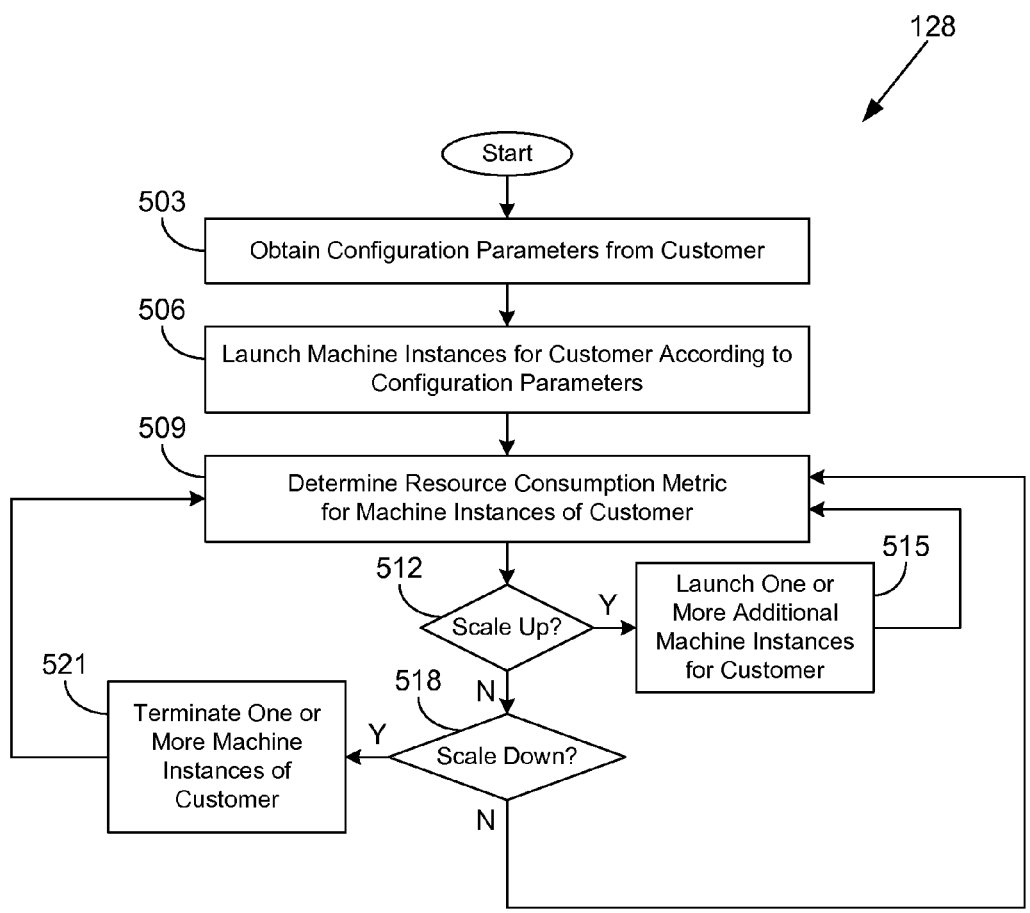
FIG. 5 is a flowchart illustrating one example of functionality implemented as portions of a resource management application executed in a computing environment in the networked environment of FIG. 1A according to various embodiments of the present disclosure.

Turning now to FIG. 5, shown is a flowchart that provides one example of the operation of a portion of the resource management application 128 according to various embodiments. It is understood that the flowchart of FIG. 5 provides merely an example of the many different types of functional arrangements that may be employed to implement the operation of the portion of the resource management application 128 as described herein. As an alternative, the flowchart of FIG. 5 may be viewed as depicting an example of steps of a method implemented in the computing environment 103a (FIG. 1A) according to one or more embodiments.

Beginning with box 503, the resource management application 128 obtains one or more configuration parameters from a customer at a client 106 (FIG. 1A). The configuration parameters may include quantities of machine instances, types of machine instances, thresholds, automatic scaling rules, billing-related parameters, and/or other parameters. A non-limiting example of an automatic scaling rule may be to scale up by one "large" machine instance when average memory consumption is above 70% for one hour. Another non-limiting example of an automatic scaling rule may be to scale down by one "medium" machine instance when the spot price per hour for the "medium" machine instance meets a threshold. In box 506, the resource management application 128 launches one or more machine instances for the customer in the cloud computing resource 120a (FIG. 1A) according to the configuration parameters.

In box 509, the resource management application 128 determines a resource consumption metric for the machine instances of the customer in the cloud computing resource 120a. Such a metric may relate to memory consumption, processor consumption, network bandwidth consumption, and so on. In box 512, the resource management application 128 determines whether the resources allocated to the customer in the cloud computing resource 120a are to be scaled up. For example, the resource consumption metric may be compared to one or more thresholds. If the resources are to be scaled up, the resource management application 128 continues to box 515 and launches one or more additional machine instances for the customer in the cloud computing resource 120a. The resource management application 128 then returns to box 509 and continues to determine the resource consumption metric.

If, instead, the resource management application 128 determines that the resources allocated to the customer are not to be scaled up, the resource management application 128 moves from box 512 to box 518. In box 518, the resource management application 128 determines whether the resources allocated to the customer in the cloud computing resource 120a are to be scaled down. For example, the resource consumption metric may be compared to one or more thresholds. If the resources allocated to the customer are to be scaled down, the resource management application 128 proceeds from box 518 to box 521 and terminates one or more machine instances of the customer in the cloud computing resource 120a. The resource management application 128 then returns to box 509 and continues to determine the resource consumption metric.

If, instead, the resource management application 128 determines that the resources allocated to the customer are not to be scaled up or down, resources are maintained at the current level. The resource management application 128 then returns to box 509 and continues to determine the resource consumption metric. In some cases, multiple customers of a hosting provider may share the cloud computing resource 120a and instance types and/or other characteristics may be optimized based at least in part on the usage of the customers.

Figure 6:
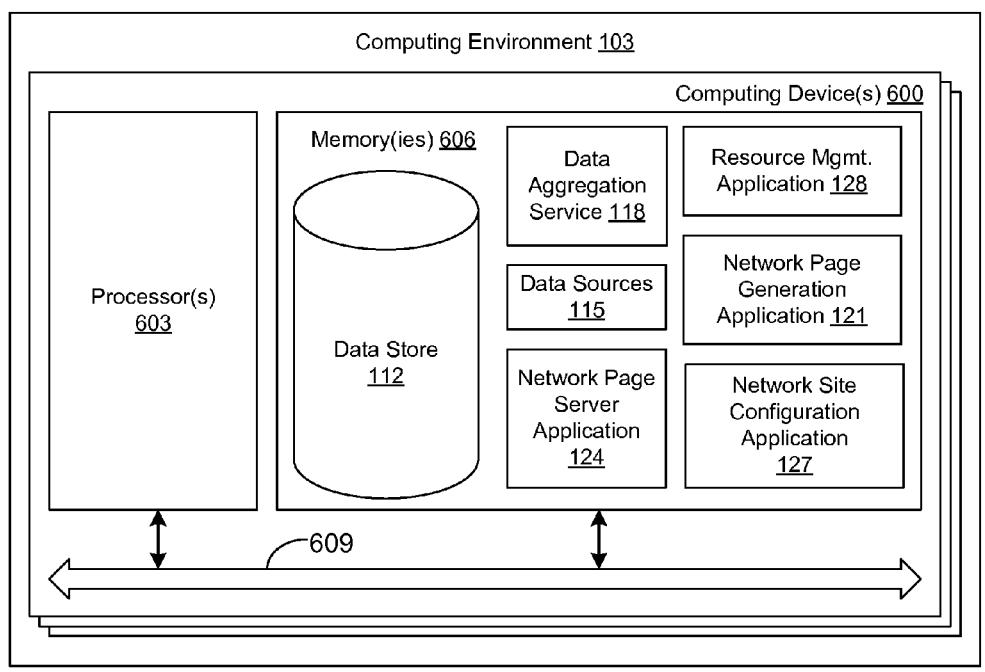
FIG. 6 is a schematic block diagram that provides one example illustration of a computing environment employed in the networked environments of FIGS. 1A and 1B according to various embodiments of the present disclosure.

With reference to FIG. 6, shown is a schematic block diagram of the computing environment 103a according to an embodiment of the present disclosure. The computing environment 103a includes one or more computing devices 600.

Each computing device 600 includes at least one processor circuit, for example, having a processor 603 and a memory 606, both of which are coupled to a local interface 609. To this end, the computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the data sources 115, the data aggregation service 118, the network page generation application 121, the network page server application 124, the network site configuration application 127, the resource management application 128, and potentially other applications. Also stored in the memory 606 may be a data store 112 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the data sources 115, the data aggregation service 118, the network page generation application 121, the network page server application 124, the network site configuration application 127, the resource management application 128, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3-5 the functionality and operation of an implementation of portions of the network page generation application 121, the network site configuration application 127, and the resource management application 128. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 3-5 show a specific order of execution, it is understood that the order of execution may differ from that which is depicted. For example, the order of execution of two or more blocks may be scrambled relative to the order shown. Also, two or more blocks shown in succession in FIGS. 3-5 may be executed concurrently or with partial concurrence. Further, in some embodiments, one or more of the blocks shown in FIGS. 3-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the data sources 115, the data aggregation service 118, the network page generation application 121, the network page server application 124, the network site configuration application 127, and the resource management application 128, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying at least one program executable in at least one computing device, the at least one program comprising:
   code that obtains, in at least one machine instance hosted by a hosting provider on behalf of a customer, a request for a network page from a client;
   code that obtains, in the at least one machine instance, aggregated data from a data aggregation service, the aggregated data being aggregated by the data aggregation service from a plurality of data sources;
   code that executes, in the at least one machine instance, page generation code supplied by the customer to generate the network page in response to the request, wherein the code that executes is configured to facilitate access by the page generation code to the aggregated data as at least one predefined variable, and the page generation code is restricted from directly accessing the aggregated data;
   code that takes an action in response to detecting that the page generation code attempts to directly access the aggregated data, wherein the action is one of: refraining from executing the page generation code, terminating the page generation code, or replacing the page generation code with default page generation code;
   code that sends, in the at least one machine instance, the network page to the client;
   code that determines a resource consumption metric associated with the at least one machine instance; and
   code that automatically scales the at least one machine instance based at least in part on the resource consumption metric and at least one automatic scaling rule established by the customer.

2. The non-transitory computer-readable medium of claim 1, wherein the at least one program further comprises code that facilitates modification of a default configuration of the at least one machine instance by the customer.

3. The non-transitory computer-readable medium of claim 1, wherein the at least one program further comprises:
   code that obtains the page generation code from the customer;
   code that compiles the page generation code into a compiled version; and
   wherein the code that executes the page generation code is configured to execute the compiled version of the page generation code.

4. A system, comprising:
   at least one computing device;
   at least one machine instance executed in the at least one computing device;
   a network page generation application executable in the at least one machine instance, the network page generation application comprising:
      logic that obtains a request for a network page, the network page being associated with a network site hosted by a hosting provider on behalf of a customer;
      logic that obtains aggregated data from a data aggregation service, the aggregated data being aggregated by the data aggregation service from a plurality of data sources;
      logic that executes page generation code supplied by the customer to generate the network page in response to the request, wherein the logic that executes is configured to facilitate access by the page generation code to the aggregated data, and the page generation code supplied by the customer is restricted from directly accessing the plurality of data sources; and
      logic that takes an action in response to detecting that the page generation code attempts to directly access the plurality of data sources, wherein the action is one of: refraining from executing the page generation code, terminating the page generation code, or replacing the page generation code with default page generation code; and
   a resource management application executable in the at least one computing device, the resource management application comprising logic that facilitates configuration of the at least one machine instance by the customer.

5. The system of claim 4, wherein the network page generation application is restricted from directly accessing the plurality of data sources.

6. The system of claim 4, wherein the logic that facilitates configuration of the at least one machine instance is configured to facilitate modification of a default configuration by the customer, the default configuration being created by the hosting provider.

7. The system of claim 4, wherein the network page generation application is supplied by the customer.

8. The system of claim 4, wherein the network page generation application is supplied by the hosting provider.

9. The system of claim 4, wherein the at least one machine instance is shared by a plurality of customers of the hosting provider.

10. The system of claim 4, wherein the resource management application further comprises logic that optimizes a set of machine instance types employed in the at least one machine instance based at least in part on resource usage of the customer.

11. The system of claim 4, wherein the logic that executes the page generation code is further configured to provide the aggregated data to the page generation code as a plurality of predefined variables.

12. The system of claim 4, further comprising a network page server application executable in the at least one machine instance, the network page server application comprising logic that sends the network page to a client in response to the request.

13. The system of claim 4, wherein the resource management application further comprises logic that performs an automatic scaling of the at least one machine instance based at least in part on a resource consumption of the network page generation application and at least one automatic scaling rule established by the customer.

14. The system of claim 4, wherein the logic that facilitates configuration of the at least one machine instance by the customer further comprises logic that facilitates selection of a quantity of the at least one machine instance employed for the network page generation application.

15. The system of claim 4, wherein the logic that facilitates configuration of the at least one machine instance by the customer further comprises logic that facilitates selection of at least one of a plurality of instance types for the at least one machine instance employed for the network page generation application.

16. The system of claim 15, wherein the plurality of instance types differ with respect to at least one of: a quantity of memory resources, a quantity of processing resources, a quantity of network bandwidth resources, and an operating system.

17. The system of claim 4, wherein the at least one machine instance is administered by the hosting provider.

18. The system of claim 4, further comprising a network site configuration application executable in the at least one computing device, the network site configuration application comprising:
  logic that obtains the page generation code from the customer;
  logic that compiles the page generation code into a compiled version; and
  logic that configures the network page generation application to execute the compiled version of the page generation code.

19. The system of claim 18, wherein the network site configuration application includes a web-based distributed authoring and versioning (WebDAV) interface.

20. The system of claim 18, wherein the logic that obtains the page generation code from the customer is configured to obtain a web application archive (WAR) file from the customer, and the WAR file includes the page generation code.

21. A method, comprising the steps of:
  executing, in at least one computing device, at least one machine instance for use by a customer of a hosting provider;
  obtaining, in the at least one machine instance, a request for a network page from a client;
  obtaining, in the at least one machine instance, aggregated data from a data aggregation service hosted by the hosting provider, the aggregated data being aggregated by the data aggregation service from a plurality of data sources;
  executing, in the at least one machine instance, page generation code to generate the network page in response to the request, wherein the page generation code is restricted from directly accessing the plurality of data sources;
  initiating, in the at least one computing device, an action in response to detecting that the page generation code attempts to directly access the plurality of data sources, wherein the action is one of: refraining from executing the page generation code, terminating the page generation code, or replacing the page generation code with default page generation code;
  providing, in the at least one machine instance, the aggregated data to the page generation code as at least one predefined variable; and
  sending, in the at least one machine instance, the network page to the client.

22. The method of claim 21, wherein the at least one machine instance is restricted from directly accessing the plurality of data sources.

23. The method of claim 21, further comprising:
  determining, in the at least one computing device, a resource consumption metric associated with the at least one machine instance; and
  automatically scaling, in the at least one computing device, the at least one machine instance for use by the customer in response to the resource consumption metric.

24. The method of claim 23, wherein automatically scaling further comprises launching, in the at least one computing device, at least one additional machine instance for use by the customer.

25. The method of claim 23, wherein automatically scaling further comprises terminating, in the at least one computing device, at least one of the at least one machine instance.

* * * * *